(12) United States Patent
Goldberg et al.

(10) Patent No.: US 6,400,652 B1
(45) Date of Patent: Jun. 4, 2002

(54) RECORDING SYSTEM HAVING PATTERN RECOGNITION

(75) Inventors: Randy G. Goldberg, Holmdel; Kenneth H. Rosen, Middletown, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/205,334

(22) Filed: Dec. 4, 1998

(51) Int. Cl.[7] .................................................. H04H 9/00
(52) U.S. Cl. ................................. 369/7; 360/7; 455/3.06
(58) Field of Search ............ 369/7, 6, 8; 381/FOR 103, 381/FOR 104, FOR 102; 379/88.22, 88.09; 455/186.1, 412, 3.06; 348/553, 462, 555; 386/39, 83; 704/211, 270, 503, 504; 360/7

(56) References Cited
U.S. PATENT DOCUMENTS 5,463,599 A  10/1995  Yifrach et al. ................. 369/7

Primary Examiner—Ali Neyzari

(57) ABSTRACT

A recording system that is automatically triggered in response to the detection of a triggering event to record a desired signal. In order to determine whether the triggering event is present in the input signal, the recording system of the present invention detects whether a recognized pattern in the input signal corresponds to a reference pattern maintained in memory. Alternatively, the triggering event may be detected by performing a predetermined logic operation on those recognized patterns that match at least one of the reference patterns. The present invention also employs a buffer for delaying the input signal by a predetermined duration. Once the triggering event is detected, a recording device is activated to record the delayed signal for at least the predetermined duration.

20 Claims, 7 Drawing Sheets

RECORDING SYSTEM HAVING PATTERN RECOGNITION

BACKGROUND OF THE INVENTION

The present invention is directed to a buffer recording system that is automatically triggered in response to a triggering event to record a desired portion of a signal. The detection of the triggering event involves detecting whether a predetermined relationship exists between a recognized pattern in the signal and a reference pattern maintained in memory.

U.S. Pat. No. 5,463,599 discloses a buffer system for radio receivers that operates according to several different modes of operation. Each of these modes relies on a buffer for continuously storing in digital form the radio signals last outputted by a processing circuit over a predetermined time interval. The Skip-Mode of operation allows a user to "skip" over unwanted radio broadcasts such as, for example, commercial breaks. In this mode, the audio circuit is connected to receive the radio signals from a buffer at first with a slowly increasing delay from real-time until the delay reaches the predetermined time interval of the buffer, and thereafter with a delay from real-time equal to that of the predetermined time interval. The Skip-Mode thus allows the portion of the radio signals equal to that of the predetermined time interval to be skipped.

In a Standby-Mode, the system of the '599 patent causes the buffer to store the radio signals even when the radio receiver is otherwise turned off, thereby allowing the user to listen to information that had been broadcast before the user turned on the radio.

In a Forward-Mode, the system of the '599 patent causes the buffer to store the radio signals for the predetermined interval after the radio is turned off, thereby allowing the user to record for later playback information that was broadcast after the user turned off the radio receiver.

What is common to all of these modes of operation in the system of the '599 patent is that in order to record a desired broadcast, the user must know when the desired program is to be broadcast. In either one of the Standby and Forward modes of operation, since the desired program must be broadcast within the predetermined time interval of the buffer in order to be recorded, the user must determine the time at which these modes are to be implemented in order to ensure that the desired program and the predetermined time interval coincide. A drawback to this system is that if the user forgets or does not know when the desired program is to be broadcast, that program will not be recorded in the buffer.

SUMMARY OF THE INVENTION

What is therefore needed is a recording system that is automatically triggered to record a desired program by detecting a triggering event that corresponds to a particular detectable feature of the desired program. In such a system, a user would not need to know in advance when the recording mode is to be implemented.

In order to achieve this object, the present invention is directed to a recording system that delays an input signal by a predetermined duration. The recording system of the present invention recognizes at least one pattern of the signal and determines whether the at least one recognized pattern corresponds to a triggering event. If the at least one recognized pattern corresponds to the triggering event, the recording system records the delayed signal for at least the predetermined duration.

The recording system of the present invention includes a recording buffer having an input for receiving at least one signal and an output for supplying the at least one signal delayed by a predetermined duration. The recording system also includes at least one pattern recognizer having an input for receiving the at least one signal and a storage device in communication with the pattern recognizer. The storage device stores a plurality of reference patterns, and the pattern recognizer includes an output for producing a triggering signal if a pattern of the at least one signal corresponds to at least one of the plurality of reference patterns. A recording device in the recording system has a first input in communication with the output of the recording buffer and a second input in communication with the output of the at least one pattern recognizer. The recording device is activated to record the at least one delayed signal for at least the predetermined duration if the triggering signal is supplied from the output of the pattern recognizer.

According to another embodiment of the present invention, a processing device is provided in the recording system in order to perform a logical operation on the outputs provided by the pattern recognizer. If the logic operation yields a result indicating the presence of a triggering event, the processing device will activate the recording device in order to record the at least one delayed signal for at least the predetermined duration.

Some of the applications to which the present invention may be directed include the automated triggering of the recording of desired radio and television programs, certain stochastic signals, or any other signal capable of being recorded on a recording medium.

DETAILED DESCRIPTION

Figure 1:
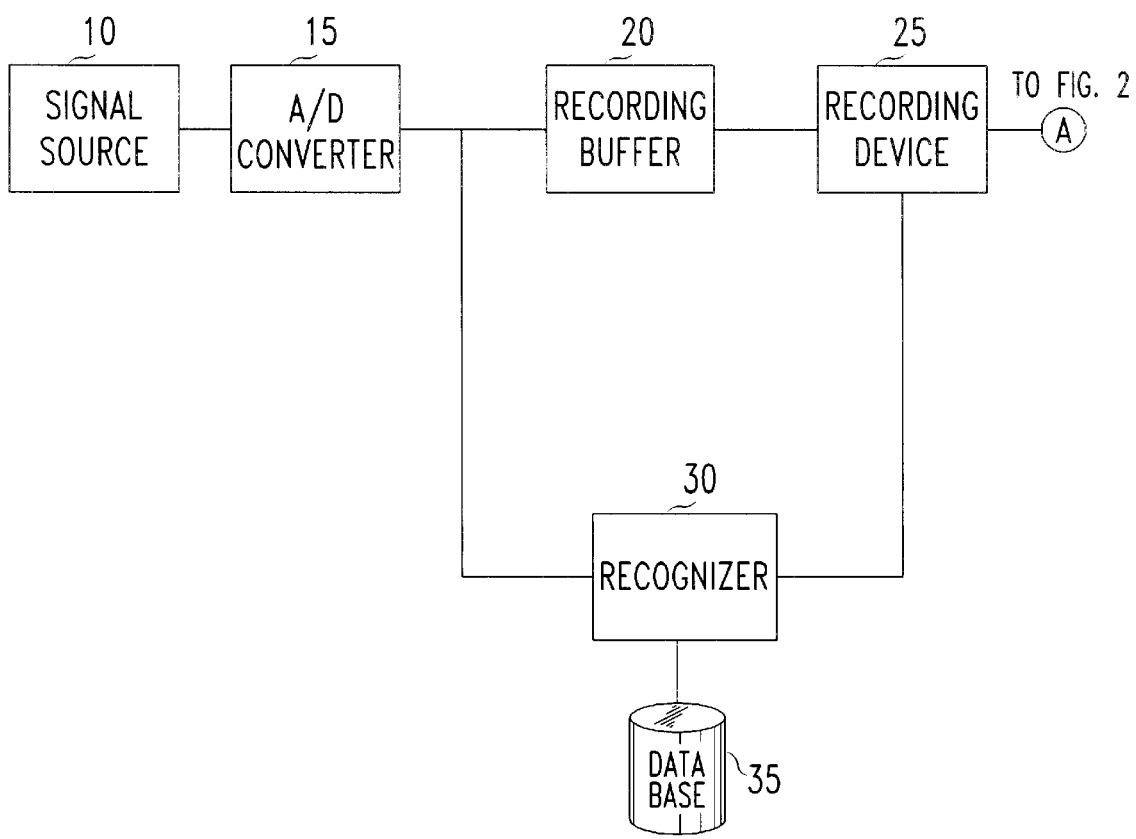
FIG. 1 illustrates a recording system according to a first embodiment of the present invention.

FIG. 1 illustrates a buffered recording system 100 according to an embodiment of the present invention. Reference character 10 refers to a signal source that is the subject of the recording operation performed by the system 100 of FIG. 1. In this embodiment, signal source 10 comprises an audio signal source, although, as shall be explained later, the buffered recording provided by the present invention is also useful with such other types of signal sources as, for example, video, data (coded or uncoded), or stochastic signal sources. The present invention is thus compatible with any type of signal source that produces signals that are capable of being recorded in any suitable recording medium. Further, the exemplary audio signal source 10 may correspond to any type of device that generates an audio signal. For instance, the audio signal source 10 may comprise the audio signal output of a television, VTR (video tape recorder), radio receiver, telephone, or any other device capable of producing an electrical signal representative of an acoustic pressure wave. If the audio signal source is embodied as a television, radio receiver, VTR, or other similar device, the audio signal may be provided from an audio output jack of such devices. In the case of telephones, JK AUDIO, INC. produces a tap, Model No. THAT-1 QUICKTAP, that allows an audio channel to be extracted as a separate signal from a telephonic communication signal.

An audio signal from audio signal source 10 is supplied over any suitable signal transmission medium, including wireless transmission media, to an A/D converter 15. Of course, if the audio signal source 10 itself produces a digital audio signal, then A/D converter 15 need not be incorporated into the buffered recording system of the present invention. The digitized audio signal produced by A/D converter 15 is supplied both to FIFO (first in-first out) recording buffer 20 and speech recognizer 30. Recording buffer 20 is an off-the-shelf component that may comprise any suitable delay element. The recording buffer 20 may be arranged to continuously hold X seconds worth of the digitized signal supplied by A/D converter 15. Thus, every bit of data supplied to recording buffer 20 is delayed for X seconds in recording buffer 20 before being supplied to recording device 25, which is normally in an OFF state.

Speech recognizer 30 may comprise any suitable speech recognizer, such as the HARK™ 3.0 recognizer, for example, which is manufactured by BBN Co. After employing a speech recognition routine, which may, for example, be based on the Hidden Markov Model, speech recognizer 30 determines the contents of the audio information that was originally embodied in the audio signal produced by audio signal source 10. For example, if the audio signal produced by audio source represented the spoken words "My name is John", speech recognizer 30 would be capable of recognizing each of these words. For purposes of this discussion, the term "word" covers any arrangement of letters, numerals, and typographical characters, either alone or in combination with one another. Further, each detectable "word" may also be referred to as a "pattern". As shall be explained below, the output of speech recognizer 30 may correspond to several types of signals: the output may be a string of digital codes, well-known in the art, representing each of the recognized words, an indication of what type of word was recognized (a digit, a name, etc.), or simply a triggering pulse that indicates that the recognized speech corresponds to some pre-defined matching conditions, which may also be referred to as keywords.

The simplest type of output that speech recognizer 30 provides is the triggering pulse. As explained above, speech recognizer 30 generates this pulse when at least some of the speech recognized by speech recognizer 30 corresponds to certain predefined matching conditions. To use the parlance introduced above, speech recognizer 30 detects the patterns present in the digitized audio signal and then determines if the detected patterns correspond to any of the pre-stored matching conditions, which may also be referred to by the term "reference patterns". The occurrence of such a correspondence is referred to as a triggering event. The predefined matching conditions are stored in database 35. For instance, if the system 100 of FIG. 1 is intended to record any telephone numbers that are broadcast from a radio receiver serving as audio signal source, each of the numerals 0 through 9 could serve as the predefined matching conditions. These conditions would be stored in database 35 according to the same well-known digital coding used to embody the recognition results produced by speech recognizer 30.

Since database 35 is capable of being reprogrammed, the types of predefined matching conditions that will cause speech recognizer 30 to produce a triggering pulse may be changed as the user desires. For example, the contents of database 35 may be changed to the names of celebrities that the user is interested in. As speech recognizer 30 recognizes a particular word in the digitized audio signal input, speech recognizer 30 also compares the recognized word with the predefined matching conditions in database 35 in order to determine if the recognized word matches any of the conditions of database 35. Thus, in the example discussed above, if any portion of the digitized audio signal that is supplied to speech recognizer 30 contains a numeral, speech recognizer 30, once it determines that the recognized word is a numeral matching one of the pre-stored numerals in database 35, will generate at its output a triggering pulse that is supplied to recording device 25.

The above discussion has focused on triggering events that are based on certain recognized numerals or words matching pre-stored matching criteria; other types of triggering events may be based on other matching criteria. For instance, instead of issuing a triggering pulse when a word or numeral from the signal source 10 matches a pre-stored word or numeral, the triggering event could be based on a voice print analysis, in which any suitable voice pattern recognizer could be used in lieu of speech recognizer 30. In this alternative, database 35 would store the voice patterns of those persons that a user would like to record. When the detected voice pattern produced by the voice print recognizer matches one of the pre-stored voice patterns, the triggering pulse would be issued in order to initiate the automated recording of the signal from signal source 10.

When the system of FIG. 1 is embodied as an audio recording system, recording device 25 may comprise any suitable type of device capable of recording digital signals onto a recording media, such as, for example, a digital or analog audio tape recorder, or any type of computer-readable recording medium, such as a hard disk, computer data tape, floppy disk, or CD-ROM. Once recording device 25 is activated by the triggering pulse, it records the contents of the recording buffer 20. The amount of time that recording device 25 is maintained in a recording state in response to the triggering pulse is determined in advance. For instance, the recording device may be arranged to stay in an ON state for X plus Y seconds, so that digital information both preceding and succeeding the triggering event is recorded. If, during the time that recording device 25 is ON, another triggering event is detected, recording device 25 may be maintained in the ON state for a further Z seconds. In the embodiment of FIG. 1, the recorded digital audio information may be recorded as, for example, a .WAV file, or any other type of digital file suitable for a computer readable medium. The output of recording device 25, designated as point A, may be supplied to any suitable system for archiving and accessing the audio digital files produced thereby.

Figure 2:
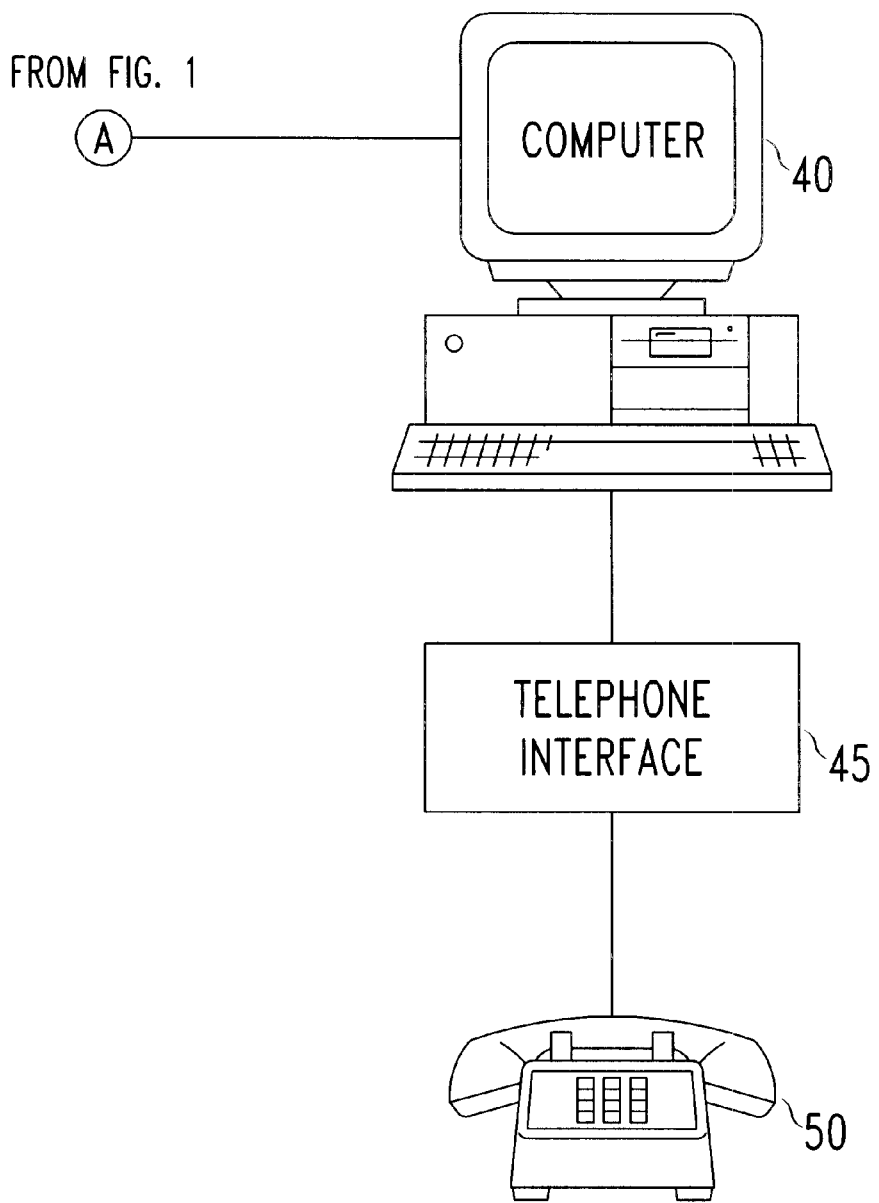
FIG. 2 illustrates a system for accessing the files created by the recording system of the present invention.

FIG. 2 illustrates one type of system 200 for archiving and accessing the audio digital files produced by the system 100 of FIG. 1. The audio digital files produced by recording device 25 are stored in general purpose computer 40, which is connected to a telephone interface 45. A user who is interested in accessing certain of the digital audio files may dial up the computer through telephone 50 and, by entering commands through the telephone keypad, access the desired digital audio files. For instance, if the audio signal source is a radio receiver, assume that the system 100 of FIG. 1 has been programmed to record the traffic reports broadcast on a certain frequency. Database 35 would therefore be programmed to cause speech recognizer 30 to produce a triggering pulse every time such words as "traffic", "congested", "bumper-to-bumper", "accident", or the like, are recognized. Alternatively, if it is known that the traffic reports broadcast on the desired radio frequency are always introduced by a particular musical jingle, any suitable sound pattern recognizer may be used instead of speech recognizer 30 in order to produce the required triggering pulse. In that case, the sound pattern recognizer would be trained, according to any suitable sound pattern training technique, to recognize the jingle of interest, and database 35 would store a digital audio code representative of this particular jingle.

Regardless of whether a speech recognizer or sound pattern recognizer is used, once the traffic report is detected in the digitized audio signal produced by A/D converter 20, the triggering pulse causes recording device 25 to begin recording the delayed digitized audio signal produced from recording buffer 20. Thus, if recording device 25 is arranged to record for X plus Y seconds, recording device 25 will record that portion of the digitized audio that is X seconds before that triggering event and Y seconds after the triggering event. If the typical duration of the desired traffic reports can be estimated beforehand, then the amount of time that recording device 25 stays ON may be sufficient to ensure that the entire traffic report is recorded. Alternatively, instead of setting the recording period to a fixed duration, which invites the possibility that the recording device will be activated for a period that is less than the duration of the desired portion of the signal from signal source 10, the recording device 25, once triggered, may continue recording until a terminating event has been detected by the particular recognizer in use. Thus, for example, when a sound pattern recognizer is used, instead of recording for X plus Y seconds, the recording device 25 may continue recording until a particular sound that is associated in database 35 with a terminating event has been detected by the sound pattern recognizer, which would respond by issuing a terminating pulse to deactivate the recording device 25. For example, the terminating event may correspond to a jingle or theme song that marks the end of the desired program. This alternative allows the system of the present invention to provide dynamic recording periods that may vary according to the duration of the desired signal portion to be recorded and eliminate some of the guesswork involved in estimating how long a recording period should be in order to completely record such desired portions.

Returning to the traffic report example discussed previously, once recording device 25 has finished recording the traffic report, the digital file corresponding to that recording is supplied to computer 40, where it may be indexed according to date and time according to any suitable indexing technique. Since the storage capacity of computer 40 is on the order of several gigabytes, an enormous amount of traffic reports may be maintained at computer 40. Thus, a user who accesses computer 40 through telephone 50 need not concern himself about missing the traffic report on the radio. If the user has missed a traffic report, the user may dial into computer 40 and, through the entry of certain commands via the telephone keypad, access the desired traffic report for replay over the telephone. If the telephone 50 is a cellular phone, an automobile operator need not wait for the next traffic report or switch stations to find one that is currently providing a traffic report. Instead, the operator may dial into the system 200 of FIG. 2 at any time to hear the most recent traffic report.

Figure 3A:
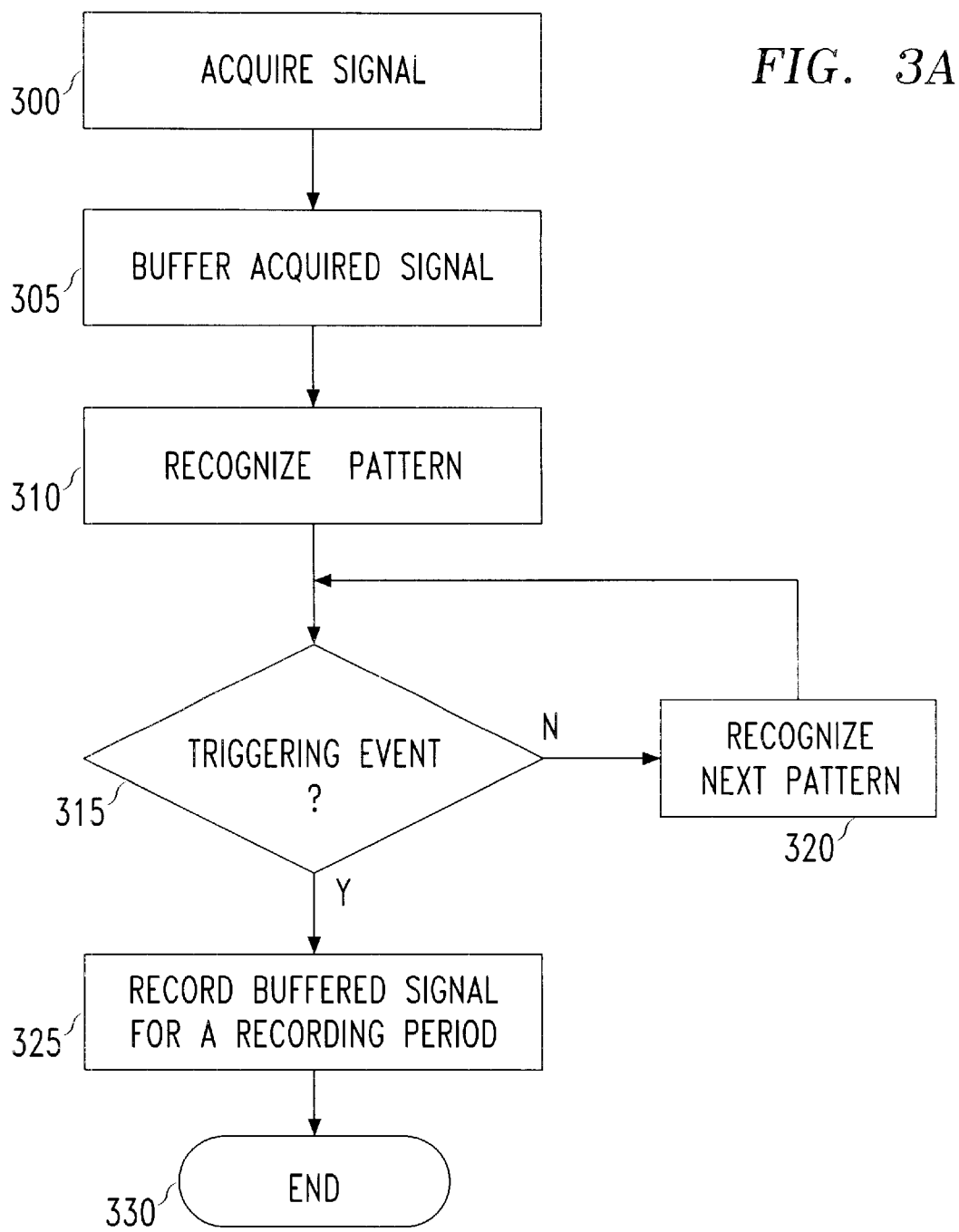
FIG. 3A illustrates a flow diagram representing an operation of the recording system of the present invention.

FIG. 3A illustrates a flow diagram corresponding to the operation of the system 100 of FIG. 1. The system 100 of FIG. 1 first acquires a signal from a particular signal source (step 300). As explained above, the acquired signal may correspond to any type of signal that is capable of being recorded onto a medium, such as, for example, audio, video, data, video, film, animation, image, or stochastic. After converting the signal to a digital signal (assuming that the acquired signal is analog), the system 100 supplies the acquired signal to recording buffer 20 (step 305), which, as explained above, continuously delays the acquired signal by X seconds. At the same time, the acquired signal is passed to a recognizer 30 that detects the presence of certain patterns in the acquired signal (step 310). For example, if the acquired signal is a speech signal, the patterns to be recognized correspond to words spoken by a person. Speech patterns, however, are not the only types of patterns that the present invention detects and processes. Other types of patterns that may be detected and processed by the present invention include sound patterns such as jingles, visual patterns such as face prints and other optically recognizable indicia, and recurring, nonrandom patterns that occur in signals that are otherwise stochastic. After a pattern is detected in the acquired signal, the system 100 determines whether the detected pattern corresponds to a triggering event (step 315). The system 100 detects the presence of such a triggering event by determining whether the detected pattern corresponds to any predetermined matching conditions maintained in database 35. If the detected pattern is not determined to be a triggering event, then the system 100 continues processing the acquired signal to detect the next pattern (step 320). If the detected pattern is a triggering event, then recording device 25 is activated to record the buffered acquired signal for a particular recording period (step 325). In the system of FIG. 1, the recording device is maintained in an activated state for X plus Y seconds, but the recording device 25 may be activated for whatever period of time is suitable for the application at hand.

Figure 3B:
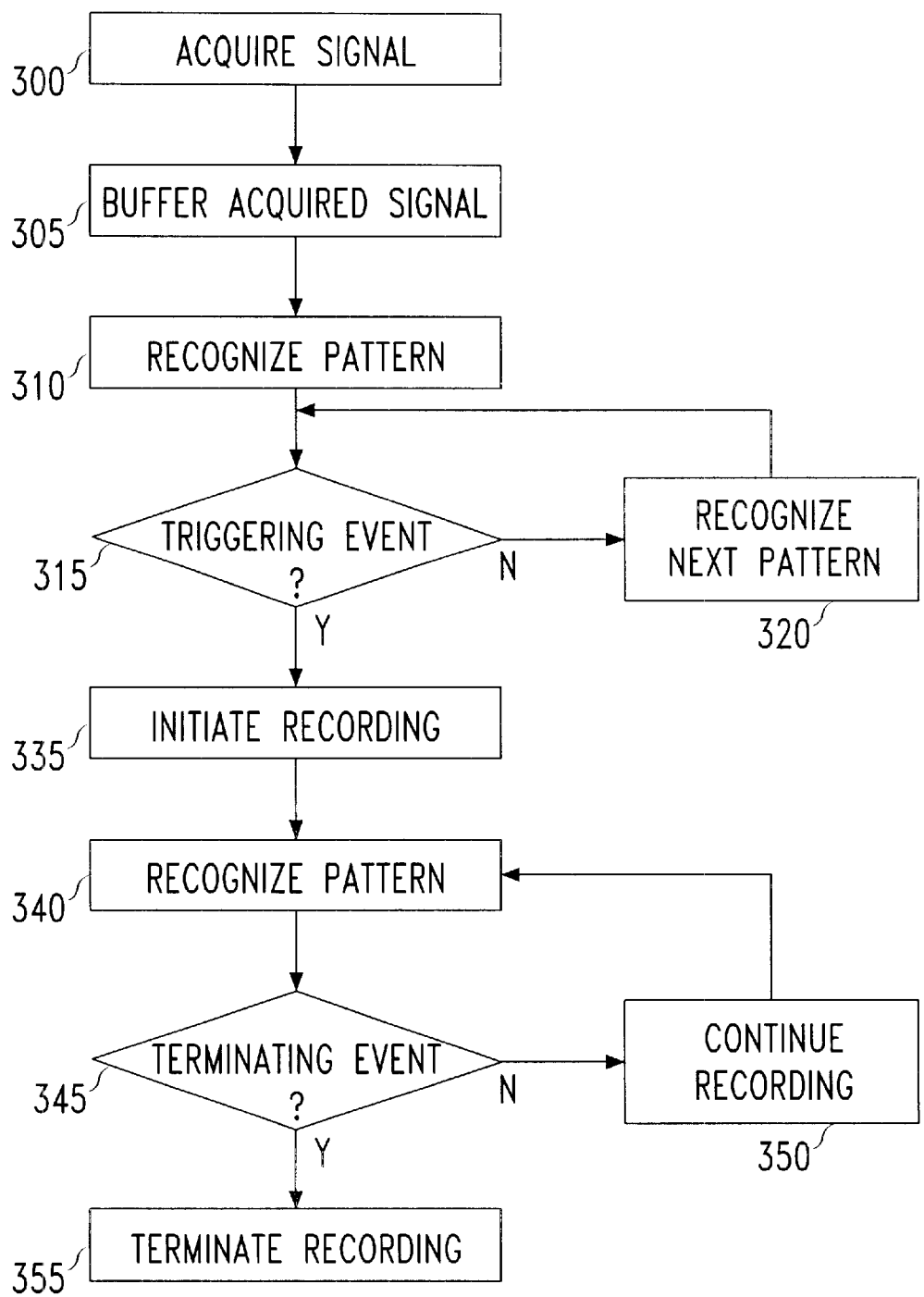
FIG. 3B illustrates a flow diagram representing another operation of the recording system of the present invention.

For example, with respect to the ability of the present invention discussed above to activate the recording device for dynamically determined periods of time, FIG. 3B illustrates a flow diagram representing such an operation. Those steps in FIG. 3B that are the same as in FIG. 3A have been accorded the same reference characters. As with FIG. 3A, the operation in FIG. 3B begins with the acquisition of a signal, the buffering of the acquired signal, and the recognition of a pattern in the signal (steps 300, 305, 310). If the recognized pattern corresponds to a triggering event (step 315), the recording of the signal at recording device 25 is initiated (step 335). During this recording operation, recognizer 30 continues to recognize patterns; at this point in the operation, if the recognized pattern corresponds to a terminating event (step 345), which may correspond to a particular jingle or image normally associated with the conclusion of a desired program, the recording of the acquired signal is terminated (step 355). If the recognized pattern does not correspond to the terminating event, the recording device continues the recording operation (step 350).

Figure 4:
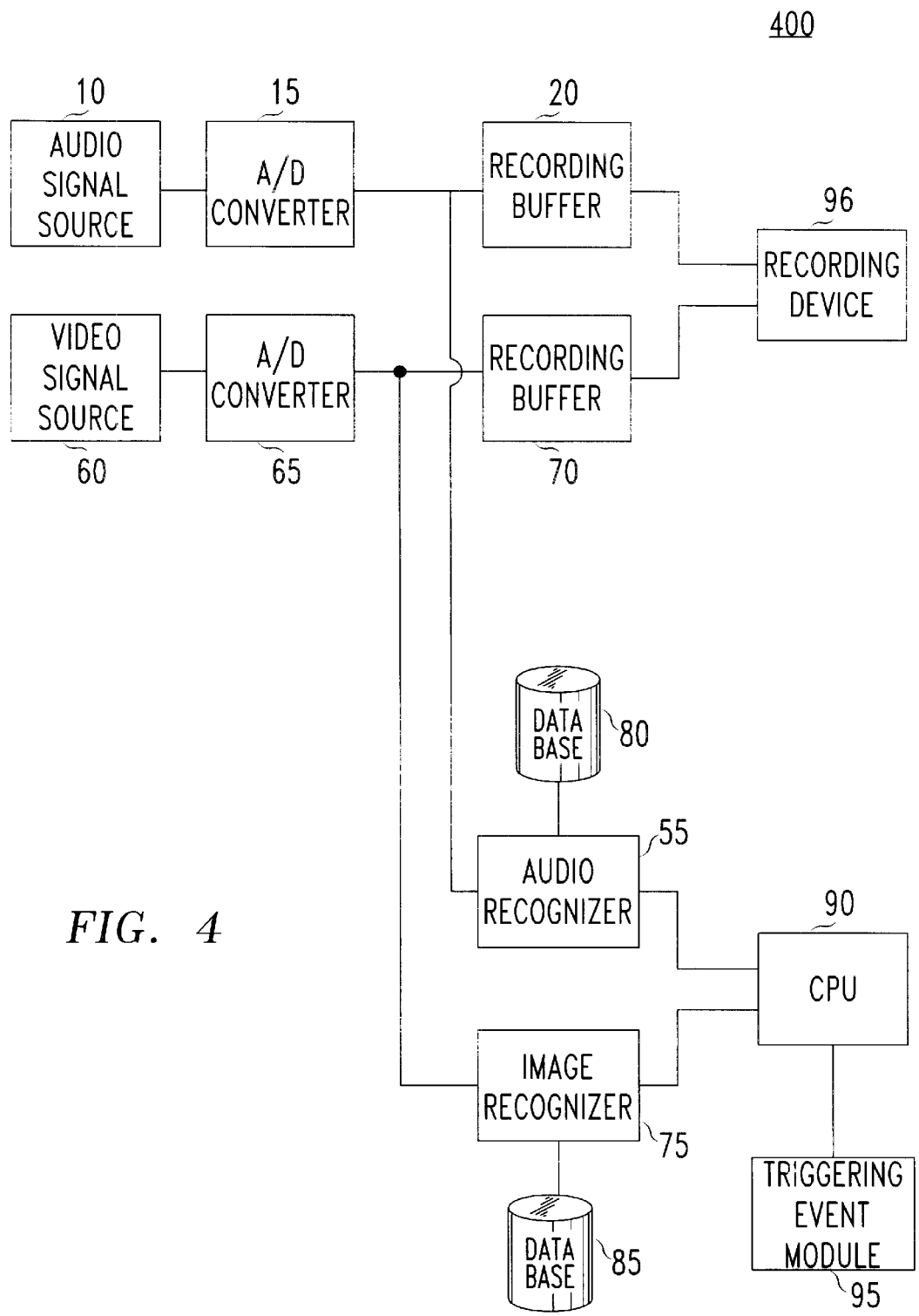
FIG. 4 illustrates a recording system according to another embodiment of the present invention.

FIG. 4 illustrates another embodiment of the present invention in which the compatibility of the present invention with multiple types of signal sources is demonstrated. In FIG. 4, those components of system 400 that are also present in system 100 of FIG. 1 are associated with the same reference characters. In FIG. 4, the system 400 detects patterns in both audio and video signals, but, as explained above, other types of signals may be used as well. As demonstrated in FIG. 4, two signal branches for acquiring signals are present. As explained in FIG. 1, the audio signal branch includes an audio signal source 10, an A/D converter 15, and recording buffer 20. FIG. 4 also includes a video signal branch that includes a video signal source 60, an A/D converter 65, and a second recording buffer 70. The video signal source 60 may comprise a video output of a television or a video camera. T he acquired video signal is fed to an A/D converter 65 that produces a digitized video signal. If the signal from video signal source 60 is digital (such as, for example, from an HDTV video signal), then A/D converter is omitted from system 400. The digitized video signal is supplied to recording buffer 70, the output of which provides the digitized video signal delayed by a predetermined duration.

The digitized audio signal and the digitized video signal are supplied to respective recognizers 55 and 75. The audio recognizer 55 may correspond to a speech recognizer, but it may also employ other well-known techniques to recognize other types of audio patterns besides words. Database 80 maintains a library of predetermined audio reference patterns; audio recognizer 55, using well-known techniques, determines whether a match exists between the detected pattern and any of the predetermined audio patterns in database 80. If a match is determined to exist between a recognized pattern and one of the predetermined patterns, audio recognizer 55 produces an output signal indicative of the type of match that was detected. For instance, if the match is determined to exist with respect to a numeric pattern, the output signal indicates that the match was based on a numeric pre-stored pattern. This may be accomplished using existing pattern recognition processing techniques.

Recognizer 75 corresponds to an image pattern recognizer which employs well-known techniques to recognize specific visual patterns, such as, for example, a human face. Database 85 maintains a library of predetermined visual reference patterns, and image recognizer 75, using well-known techniques, determines whether a detected visual pattern matches any of the predetermined visual patterns in database 85. Instead of producing a pulse, the respective outputs of audio recognizer 55 and image recognizer 75 produce a signal indicative of the type of matching condition that the recognizers 55, 75 determined exists between the detected pattern and the predetermined patterns in databases 80, 85. For example, the audio recognizer 55 may produce an output signal that indicates that the detected pattern of the digitized audio signal matches a particular word prestored in database 80, such as, for example, the name of a TV show. This may be accomplished using existing audio pattern recognition techniques. The image recognizer 75 may produce an output signal that indicates that the detected pattern of the digitized video signal matches a particular visual pattern prestored in database 85, such as, for example, the facial features of a particular actor or actress, or in the case of an optical character recognizer, the logo of a desired TV show. This may be accomplished using existing visual pattern recognition techniques.

Each of the output signals of audio recognizer 55 and image recognizer 75 are supplied to CPU 90, which operates in accordance with an algorithm maintained in triggering event module 95. Based on this algorithm, CPU 90 performs a logic operation on the audio recognizer output signal and the image recognizer output signal in order to determine whether a triggering pulse should be provided to recording device 96. Although FIG. 4 illustrates recording device 96 as being common to the audio and video branches, the present invention may also provide a different recording device to each signal branch of system 400. For exemplary purposes only, recording device 96 may comprise a VTR. If the recording device 96 is a digital VTR, then the digitized output signals of recording buffers 20 and 70 may be supplied directly to the digital VTR. If the recording device is an analog VTR, then the digitized output signals of recording buffers 20 and 70 would first need to be supplied to a D/A converter (not shown) before being supplied to the analog VTR. Thus, system 400 may be used to detect when certain programs to be recorded are being broadcast. For example, a user may want to record every broadcast of a popular program. The program airs not only as new episodes on a weekly basis, but repeats of the program also air at a higher, perhaps daily, frequency. If the broadcasts of this program occur on different channels, the system 400, using commonly known techniques, can monitor several channels in order to detect the program on any combination of channels. The name of the program most likely will be embodied as a word or sequence of words that will be aurally pronounced at some point prior to the program broadcast; this word or sequence of words may be preprogrammed into database 80, which may be updated periodically to maintain an up-to-date library of word sequences that are of interest to the user. Of course, database 80 may store many different words, permitting several different programs or other broadcasts of interest to be monitored and detected. Several actors and actresses will of course star in the program; their facial features may be digitized and stored in database 85 using commonly known training techniques. As with database 80, database 85 may be trained to store the likenesses of many actors of interest, and it may be updated periodically to maintain an up-to-date library of actors and actresses or other television personalities that are of interest to the user. Furthermore, if the image recognizer 75 also employs an optical character recognition technique, database 85 may include digital representations of the logos of programs that are of interest to the user.

In order to record a program that is of interest to the user, the system 400 monitors both the audio signal and video signal outputs produced by the broadcast to detect a particular word that matches a keyword stored in database 80 and a particular visual pattern that matches one maintained in database 85. For example, if the user wishes to record the program XYZ starring John Smith, system 400 will have been trained to detect any aural pronunciation of the word "XYZ" and the facial likeness of the actor John Smith. Once the word XYZ is detected by audio recognizer 55 and the facial likeness of John Smith is detected by image recognizer 75, the output signals indicative of such detections are supplied to CPU 90, which performs a predetermined logical operation on these output signals. For instance, CPU 90 may generate a triggering pulse only if both the word "XYZ" and the face of John Smith have been detected. Alternatively, if the user is interested in recording any broadcast dealing with John Smith, whether the broadcast is a news report, celebrity profile, or the like, then module 95 may include instructions requiring CPU 40 to generate a triggering pulse whenever the facial likeness of John Smith or a vocal pronunciation of his name is detected (database 80 having been previously trained to recognize the word sequence "John Smith"). In this situation, all broadcasts involving John Smith, including the show XYZ, would be recorded. As demonstrated by this discussion, the use of a CPU 90 and accompanying triggering event module 95 provides a flexible way to mold the operation of system 400 in accordance with a user's preferences. The logic operations that CPU 90 may carry out are not limited to those discussed in the above exemplary illustration; instead, CPU 90 may carry out whatever logic operations are necessary to effectuate the desired recording operations to be performed by system 400. For example, if the user is not interested in recording broadcasts that include only brief appearances by John Smith, CPU 90 may employ counting logic (or some other commonly known timing logic) that will authorize CPU 90 to generate a triggering pulse only if John Smith's facial likeness has been detected X amount of times (or for longer than a certain duration). If the user is not interested in broadcasts that involve John Smith and actor Joseph Brown, a logic operation that would achieve this preference would prohibit CPU 90 from generating the triggering pulse if both the facial likeness of Joseph Brown is detected by image recognizer 75, even if the facial likeness of John Smith is detected as well.

Figure 5:
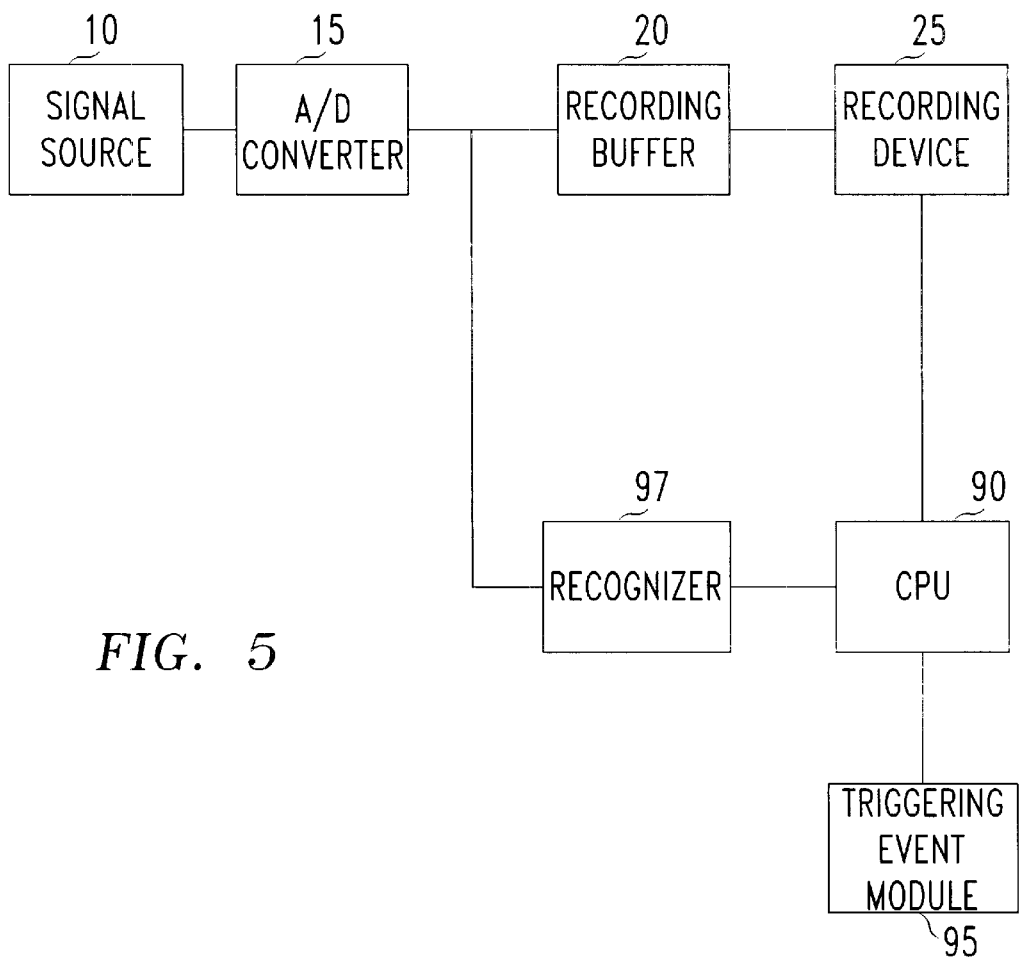
FIG. 5 illustrates a recording system according to still another embodiment of the present invention.

The use of CPU 90 to perform logic operations on output signals provided by pattern recognizers may be implemented in the system of FIG. 1 as well. This is shown in FIG. 5. Instead of using a speech recognizer 30 that would produce only a triggering pulse, the system 500 of FIG. 5 would employ a pattern recognizer 97 similar to the ones employed in system 400 of FIG. 4, in which an output signal indicating the type of match that is detected is generated. Thus, returning to the traffic report example discussed above, in order to ensure that the broadcast being recorded is indeed the traffic report and not some unrelated news story that uses certain of the keywords in database 35, CPU 90 may perform a logic operation that requires the word "traffic" (or some combination of "traffic" with the keywords "congestion", "accident", or the like) to appear a predetermined amount of times before the triggering pulse may be supplied to recording device.

Figure 6:
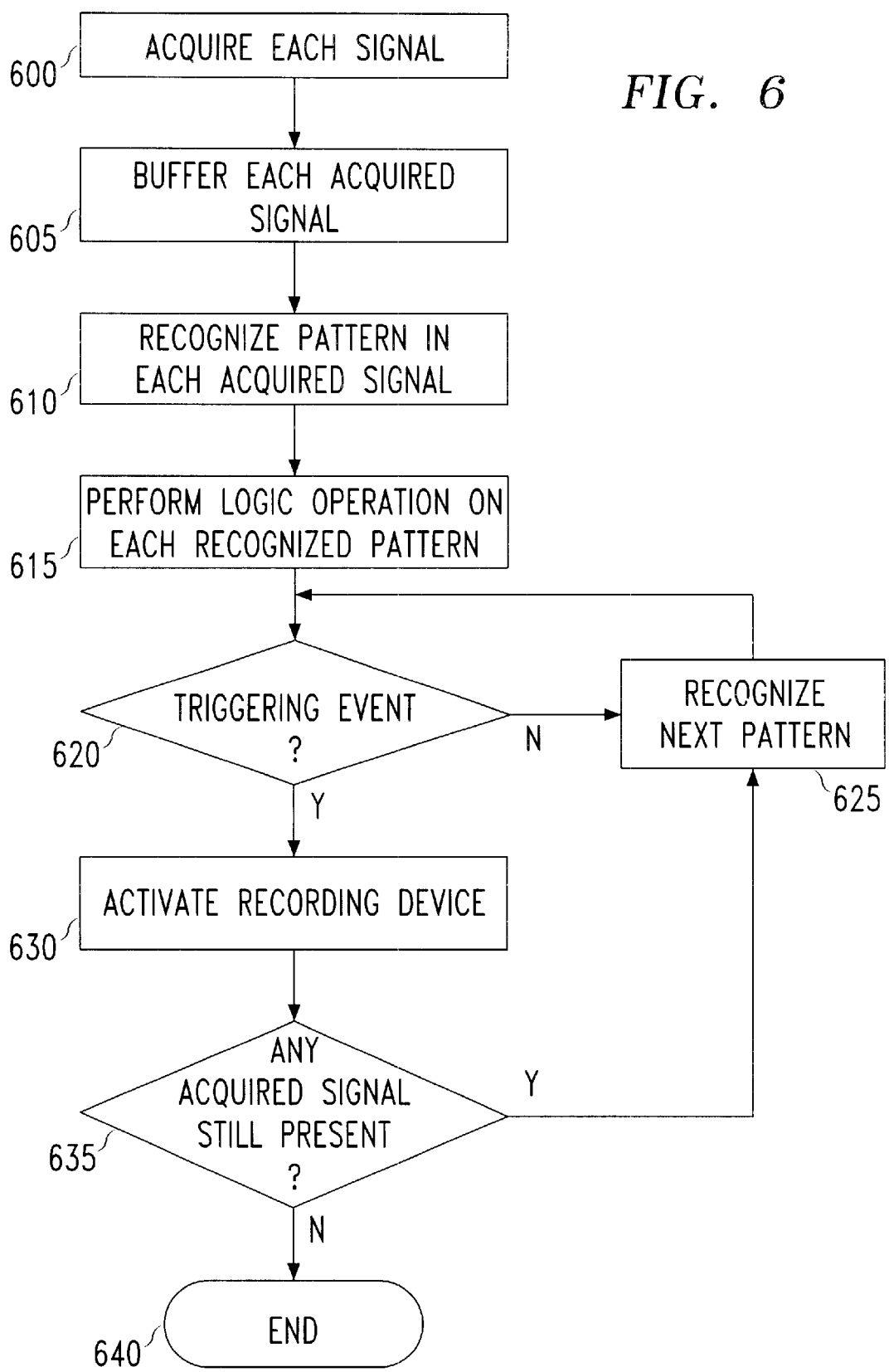
FIG. 6 illustrates a flow diagram representing another operation of the recording system of the present invention.

FIG. 6 illustrates a flow diagram corresponding to the operation of system 400 in FIG. 4. The system 400 of FIG. 4 first acquires each signal from a corresponding signal source (step 600). Although system 400 is illustrated in FIG. 4 as accommodating only a single audio source and a single video source, the present invention is compatible with any number of signal sources that need not be limited to audio or video type signals. As explained above, the acquired signal may correspond to any type of signal that is capable of being recorded onto a medium, such as, for example, audio, video, data, image, film, animation, or stochastic. After converting each acquired signal to a corresponding digital signal (assuming that the acquired signals are analog signals), the system 400 supplies each acquired signal to a corresponding recording buffer 20,70 (step 605), which, as explained above, continuously delays the acquired signal by X seconds. At the same time, each acquired signal is passed to a corresponding recognizer 55, 75 that detects the presence of certain patterns in the acquired signal (step 610). As explained in connection with FIG. 4, audio recognizer 55 detects words or other sound pattern patterns in the digitized audio signal, and image recognizer 75 detects image patterns such as facial features or optically recognizable characters. After a pattern is detected in an acquired signal, each recognizer 55, 75 determines whether the detected pattern matches a pre-stored pattern in the corresponding database 80, 85. If such a pattern is detected, the detecting recognizer 55, 75 provides an output signal indicative of the kind of match that was detected. Each of these output signals from recognizers 55, 75 is supplied to CPU 90, which performs a predetermined logic operation maintained in triggering event module 95 on the output signals to determine whether a triggering event has occurred (step 620). If no triggering event is detected, then the system 400 continues processing each acquired signal to detect the next pattern (step 625). If the performance of the logic operation determines that a triggering event has occurred, then CPU 90 issues a triggering pulse to activate recording device 25 (step 630). In the system of FIG. 4, the recording device 25 may be activated for whatever predetermined period of time is suitable for the application at hand. Regardless of whether the recording device 25 is active or not, the system 400 continues detecting patterns so long as any of the acquired signals is still present at the input of system 400 (steps 635, 625).

The present invention provides flexibility to recording operations involving any kind of recordable signal capable of exhibiting detectable patterns. Based on the pattern recognition operations discussed above, the present invention is capable of recording, on an automated basis, those signals that satisfy certain predefined criteria, as defined in accordance with the preferences and desires of any individual user. Moreover, unlike previous recording systems that can record desired signals only by first being programmed with instructions that indicate a specific time of day when the desired signals are to be broadcast, the present invention allows a user to record desired signals even if the user does not know when such signals are to be broadcast, so long as the system of the present invention is trained in the manner discussed above to recognize and respond to those patterns that identify or are associated with the desired signals. Further, the various embodiments herein discussed may be arranged as systems that are distinct from the systems from which the signals are acquired, or they may be integrated with such signal sources. For example, if the system of the present invention is to be used in connection with a television or radio serving as the signal source, the system of the present invention and the radio or television may be formed as one unitary system. Such integrated systems would be more convenient since the need to connect two separate systems together would be avoided.

What is claimed is:

1. A method of recording at least one signal, the at least one signal including at least one pattern, the method comprising the steps of:

a) delaying the at least one signal by a predetermined duration;

b) recognizing the at least one pattern of the at least one delayed signal;

c) determining whether the at least one pattern corresponds to a triggering event; and d) recording the at least one signal for a time corresponding to a recording period if the at least one pattern corresponds to the triggering event.

2. The method according to claim 1, further comprising:

e) creating at least one file corresponding to the at least one recorded signal; and f) maintaining the at least one file in an accessible storage medium.

3. The method according to claim 1, wherein the step c) comprises:

i) comparing that at least one pattern to a plurality of reference patterns; and ii) producing a trigger signal for initiating the recording of the at least one signal if the at least one pattern matches at least one of the plurality of reference patterns.

4. The method according to claim 1, wherein the step c) comprises:

i) comparing that at least one pattern to a plurality of reference patterns;

ii) determining whether the at least one pattern matches at least one of the plurality of reference patterns;

iii) producing at least one matching type signal indicative of a type of match existing between the at least one pattern and the at least one of the plurality of reference patterns;

iv) performing a predetermined logic operation as a function of the at least one matching type signal to determine whether the triggering event is present; and v) producing a trigger signal for initiating the recording of the at least one signal if the triggering event is present.

5. The method according to claim 1, wherein the at least one signal includes at least one of an audio signal, a video signal, an image signal, an animation signal, and a stochastic signal.

6. The method according to claim 1, wherein the recording period corresponds to at least the predetermined duration.

7. The method according to claim 1, wherein the step d) comprises:

i) recognizing a second pattern during the recording period;

ii) determining whether the second pattern corresponds to a terminating event; and iii) terminating the recording of the at least one signal if the second pattern corresponds to the terminating event.

8. An apparatus for recording at least one signal, the at least one signal including at least one pattern, the apparatus comprising:

a) means for delaying the at least one signal by a predetermined duration;

b) means for recognizing the at least one pattern of the at least one delayed signal;

c) means for determining whether the at least one pattern of the at least corresponding to a triggering event; and d) means for recording the at least one signal for a time corresponding to a recording period if the at least one pattern corresponds to the triggering event.

9. The apparatus according to claim 8, further comprising:

e) means for creating at least one file corresponding to the at least one recorded signal; and f) means for maintaining the at least one file in an accessible storage medium.

10. The apparatus according to claim 8, wherein the means for determining comprises:

i) means for comparing that at least one pattern to a plurality of reference patterns; and ii) means for producing a trigger signal for initiating the recording of the at least one signal if the at least one pattern matches at least one of the plurality of reference patterns.

11. The apparatus according to claim 8, wherein the means for determining comprises:

i) means for comparing that at least one pattern to a plurality of reference patterns;

ii) second means for determining whether the at least one pattern matches at least one of the plurality of reference patterns;

iii) first means for producing at least one matching type signal indicative of a type of match existing between the at least one pattern and the at least one of the plurality of reference patterns;

iv) means for performing a predetermined logic operation as a function of the at least one matching type signal to determine whether the triggering event is present; and v) second means for producing a trigger signal for initiating the recording of the at least one signal if the triggering event is present.

12. The apparatus according to claim 8, wherein the at least one signal includes at least one of an audio signal, a video signal, an image signal, an animation signal, and a stochastic signal.

13. The apparatus according to claim 8, wherein the recording period corresponds to at least the predetermined duration.

14. The apparatus according to claim 8, wherein the means for recording comprises:

i) second means for recognizing a second pattern during the recording period;

ii) second means for determining whether the second pattern corresponds to a terminating event; and iii) means for terminating the recording of the at least one signal if the second pattern corresponds to the terminating event.

15. A recording system, comprising:

a recording buffer having an input for receiving at least one signal and an output for supplying the at least one signal delayed by a predetermined duration;

a pattern recognizer having an input for receiving the at least one delayed signal;

a storage device in communication with the pattern recognizer, the storage device storing a plurality of reference patterns, wherein the pattern recognizer includes an output for producing a triggering signal if a pattern of the at least one delayed signal corresponds to at least one of the plurality of reference patterns; and a recording device having a first input in communication with the output of the recording buffer and a second input in communication with the output of the pattern recognizer, wherein the recording device is activated for a recording period to record the at least one signal if the triggering signal is supplied from the output of the pattern recognizer.

16. The recording device according to claim 15, wherein the pattern recognizer is at least one of an audio recognizer, an image recognizer, a sound pattern recognizer, and a voice print recognizer.

17. A recording system, comprising:

a plurality of recording buffers, each one of the plurality of recording buffers having an input for receiving at least one of a plurality of signals and an output for supplying the one signal delayed by a predetermined duration;

a plurality of pattern recognizers, each one of the plurality of pattern recognizers having an input for receiving a corresponding one of the plurality of delayed signals;

a plurality of storage devices, each one of the plurality of storage devices being in communication with a corresponding one of the plurality of pattern recognizers and storing a corresponding plurality of reference patterns, wherein each one of the plurality of pattern recognizers includes an output for producing a matching type signal in response to a pattern of at least one of the plurality of delayed signals corresponding to at least one of the plurality of reference patterns;

a processing device in communication with the output of each one of the plurality of pattern recognizers;

a triggering event module in communication with the processing device, the processing device performing a predetermined logic operation maintained in the triggering event module on each matching type signal in order to determine a presence of a triggering event and outputting a triggering signal if the triggering event is present; and a recording device in communication with the output of each one of the plurality of recording buffers and in communication with the processing device, the recording device being activated for a recording period in response to the triggering signal to record each signal from the plurality of recording buffers.

18. The recording device according to claim 17, wherein the plurality of pattern recognizers includes at least one of at least one audio recognizer and at least one image recognizer.

19. A recording system, comprising:

a recording buffer having an input for receiving at least one signal and an output for supplying the at least one signal delayed by a predetermined duration;

a pattern recognizer having an input for receiving the at least one delayed signal;

a storage device in communication with the pattern recognizer, the storage device storing a plurality of reference patterns, wherein the pattern recognizer includes an output for producing a matching type signal in response to a pattern of the at least one delayed signal corresponding to at least one of the plurality of reference patterns;

a processing device in communication with the pattern recognizer;

a triggering event module in communication with the processing device, the processing device performing a predetermined logic operation maintained in the triggering event module on each matching type signal in order to determine a presence of a triggering event and outputting a triggering signal if the triggering event is present; and a recording device having a first input in communication with the output of the recording buffer and a second input in communication with the processing device, wherein the recording device is activated for a recording period to record the at least one signal for at least the predetermined duration if the triggering signal is supplied from the processing device.

20. The recording device according to claim 19, wherein the pattern recognizer is at least one of an audio recognizer and an image recognizer.

* * * * *